Feb. 5, 1952 — A. G. SWENSON — 2,584,759
COVER SECURING MEANS FOR PRESSURE COOKERS AND THE LIKE
Original Filed May 25, 1946
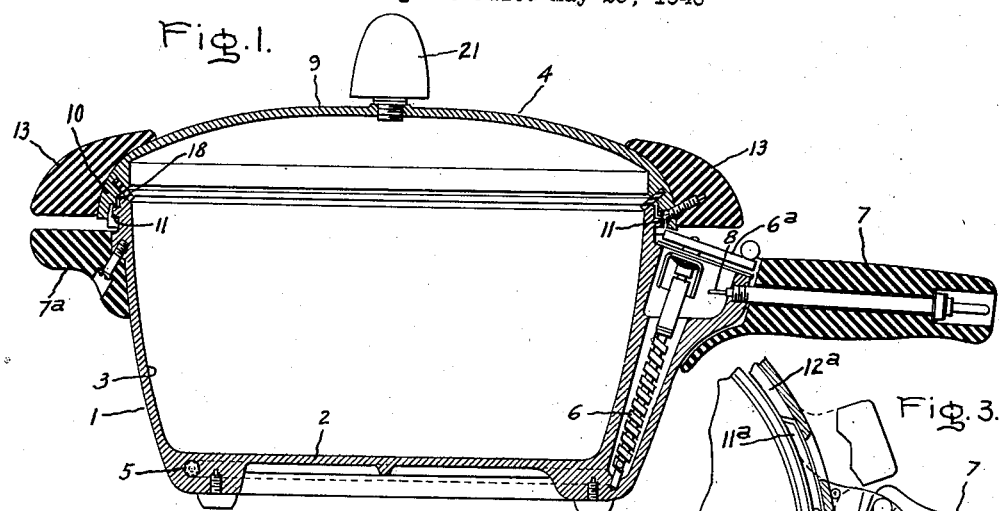
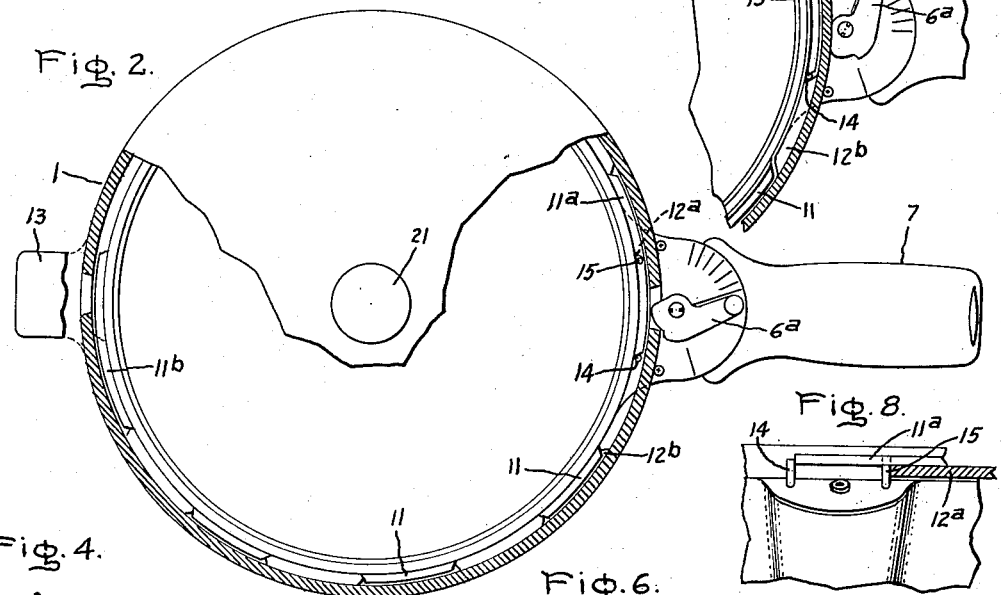
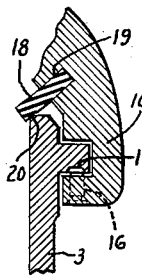
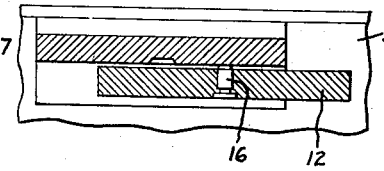
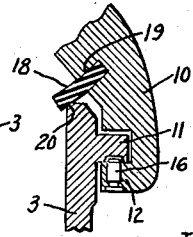
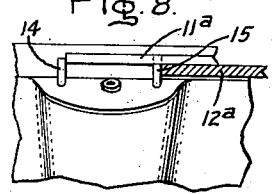
Inventor:
Alfred G. Swenson,
by Alfred E. Robst.
His Attorney.

Patented Feb. 5, 1952

2,584,759

UNITED STATES PATENT OFFICE 2,584,759

COVER SECURING MEANS FOR PRESSURE COOKERS AND THE LIKE

Alfred G. Swenson, Ontario, Calif., assignor to General Electric Company, a corporation of New York Original application May 25, 1946, Serial No. 672,250. Divided and this application May 17, 1947, Serial No. 748,802

1 Claim. (Cl. 220—40)

This invention relates to cookers, more particularly to pressure cookers, and it has for its object the provision of improved cover structure in pressure cookers embodying improved safety means for preventing the removal of the cover when pressure exists in the receptacle.

This application is a division of my copending application, Serial No. 672,250, filed May 25, 1946, and it is assigned to the assignee of that application.

More specifically, this invention contemplates an improved pressure cooker having an open-top cooking receptacle and a cover therefor. And it contemplates improved interlocking means between the cover and receptacle which is operated to lock the cover to the receptacle by a relative rotary motion between the cover and receptacle—lock them together in a sense that it prevents the cover from being forced up away from the receptacle by the steam pressure generated therein. It provides, however, for limited upward movement of the cover to an upper position with respect to the receptacle responsively to the build-up of the steam pressure; and further, it contemplates the provision of locking means operable to interlock the cover and receptacle to prevent relative rotary motion between them to unlock the first locking means, the second locking means being rendered effective by the limited upward movement of the cover to its upper position.

For a more complete understanding of this invention, reference should be had to the accompanying drawing in which Fig. 1 is a vertical sectional view taken through an electric pressure cooker embodying this invention; Fig. 2 is a plan view of the cooker shown in Fig. 1, parts being broken away and shown in section so as to illustrate certain structural details; Fig. 3 is a fragmentary view similar to Fig. 2 but illustrating certain of the elements in different operative positions; Fig. 4 is an enlarged vertical sectional view taken through a part of the cooker shown in Figs. 1–3; Fig. 5 is a vertical sectional view taken through another portion of the cooker shown in Figs. 1–3; Fig. 6 is a sectional view similar to Fig. 4 but illustrating the elements in different operative positions; Fig. 7 is a view similar to Fig. 5 but illustrating the elements in different operative positions; and Fig. 8 is a fragmentary elevation of certain elements of the cooker.

Referring to the drawing, this invention has been shown in one form as applied to an electric pressure cooker comprising a cooking receptacle 1. The receptacle 1 has a bottom wall 2 and an upright side wall 3 formed integrally with it, these walls forming a cooking receptacle having in general the shape of an ordinary saucepan open at the top, as shown. The receptacle 1 is provided with a cover 4 for closing the open top. It also is provided with an electrical heating element 5 cast within the bottom wall and which is controlled by means of a suitable temperature responsive element 6 having a temperature setting lever 6a. The saucepan further is provided with a handle 7 through which electrical supply leads 8 for the heater 5 are directed, and also with an oppositely positioned smaller handle 7a. The heater 5, its control element 6, and the leads 8, together with associated heater and controlling parts, form no part of the present invention, but constitute the subject matter of my copending application, Serial No. 672,251, filed May 25, 1946, now Patent No. 2,571,782, dated October 16, 1951, and which is assigned to the assignee of the instant application.

The cover 4, as shown, has a dome-like shape, that is, it is provided with a top wall section 9 and a downwardly extending side wall section 10, the side wall section 10 enveloping the upper portion of the upright side wall 3 of the cooking receptacle 1, as clearly shown in Figs. 1, 4 and 6.

Suitable interlocking means are provided for locking the cover 4 to the receptacle during the pressure cooking operations. This locking means comprises a series of outwardly projecting circumferentially spaced lugs 11 formed on the upper exterior surface of the upper portion of the side wall 3, and a coacting series of lugs 12 projecting inwardly from the lower inner surface of the side wall 10 of the cover 4. The two sets of lugs are so spaced and positioned that the lugs 12 on the cover may be passed downwardly through the spaces between the lugs 11 on the receptacle, as shown in Fig. 3, so that the cover may be placed upon the receptacle in covering relation, and when so placed the lugs 12 on the cover will be positioned below the level of the lugs 11 on the receptacle. The cover is then locked to the receptacle to prevent it from being blown off when the steam pressure builds up in the receptacle by rotating the cover with respect to the receptacle from its position of Fig. 3 to its position of Fig. 2. This action brings the cover lugs 12 directly under the receptacle lugs 11, as shown in Figs. 4 to 8.

Preferably, the cover 4 will be provided with a pair of oppositely positioned handles 13, and it is desired that these handles be in alignment with the saucepan handles 7 and 7a when the cover is locked in position. This not only improves the appearance of the device but is serves as an indication that the cover is locked closed. In order to insure the proper positioning of the cover on the receptacle, two of the lugs 11 on the receptacle are relatively elongated; one of these lugs is denoted by the numeral 11a and is located adjacent the handle 7, as shown in Figs. 2 and 3, while the other elongated lug is positioned diametrically opposite lug 11a and is denoted by the numeral 11b. The two pairs of lugs 12 on the cover 4 which are positioned immediately adjacent the ends of the lugs 11a and 11b when the cover is first placed upon the receptacle, as shown in Fig. 3 (the one pair shown in Fig. 3 being designated by numerals 12a and 12b), are spaced apart a greater distance than are the remainder so that the cover may be moved down into covering position. In other words, because of the provision of the two elongated lugs 11a and the complementary spacing between lugs 12, it is possible to place the cover on the receptacle only when the cover is in its position of Fig. 3 with reference to the receptacle, or is in a position 180° thereto.

Also, the receptacle 1 is provided with an upright positioning pin 14 for engaging the upper end of lug 12b of the lid 4, as viewed in Fig. 3, to properly position the cover for its movement down onto the receptacle, as a preliminary step prior to rotating it to its locked position of Fig. 2; and also is provided with a second upright locating pin 15 for engaging the lower end of lug 12a, as viewed in Fig. 2 and also as shown in Fig. 8 to position the cover in its properly closed locked position. In other words, to apply the cover 4 it is first lowered onto the receptacle with the handles 13 in the angular position indicated in Fig. 3, and which position will be determined by the interengagement of the cover lug 12b with the pin 14, and then the cover is rotated in a clockwise direction to bring the handles in alignment with the receptacle handles 7 and 7a, which operation will bring the lugs 12 under the lugs 11, and which position will be determined by the interengagement of the lug 12a with the upright pin 15 as shown in Figs. 2 and 8.

When the cover 4 is in its locked position and there is no pressure in the cooking receptacle 1, the lugs 11 and 12 will be spaced apart from each other somewhat, as shown in Figs. 4 and 5. In other words, the lugs permit limited upward movement of the cover relative to the receptacle from the position of Figs. 4 and 8 to the position of Figs. 6 and 7 where the lugs contact. This movement of the cover is effected when steam pressure exists in the receptacle and is utilized to interlock the cover with the receptacle so that it cannot be rotated to unlock the cover as long as the steam pressure exists. This locking means comprises a pin 16 mounted in one of the lugs 12 of the cover 4 and projecting upwardly from its upper surface, as shown; and a complementary socket 17 formed in the associated lug 11 of the receptacle 1. In the operation of the device, when the cover is in its pressure locked position of Fig. 2, the pin 16 will be brought into registry with the socket 17, and then when the pressure builds up in the receptacle the cover 4 will be elevated and thereby elevate the pin 16 into the socket 17, as shown in Fig. 7. The pin and socket coact to prevent any rotary motion of the cover to unlock the cover from the receptacle. In one specific embodiment of the invention, the inner surface of the cover has an area of approximately 75 square inches. Thus, with only one pound of steam pressure in the receptacle there will be a 75 pound upward pressure holding the pin 16 in the socket 17. It will be understood, therefore, that the cover can be turned to unlock it from the receptacle only when an extremely low and safe pressure exists in the receptacle 1.

A seal 18 mounted in a groove 19 in the cover engages edge 20 of the receptacle in order to effect a pressure seal between the cover and the receptacle. This seal is described and claimed in my aforementioned copending application, Serial No. 672,250. The seal effected by the member 18 is maintained while the cover is in its lower position of Fig. 4, while the cover is being elevated to its position of Figs. 6 and 7, and when the cover is in this position.

The cover 4 is provided with a suitable safety and blow-off valve 21 which may have any suitable construction, but preferably a valve will be used such as described and claimed in my copending application Serial No. 672,252, filed May 25, 1946, now Patent No. 2,563,563, dated August 7, 1951, and assigned to the assignee of the instant application.

While I have shown a particular embodiment of my invention, it will be understood, of course, that I do not wish to be limited thereto since many modifications may be made, and I, therefore, contemplate by the appended claim to cover any such modifications as fall within the true spirit and scope of my invention.

What I claim as new and desire to secure by Letters Patent of the United States is:

A pressure cooker comprising an open-top receptacle having an upright side wall, a plurality of circumferentially spaced receptacle lugs projecting outwardly from said side wall adjacent to but below the top edge thereof, a cover for said receptacle having a depending side wall which when the cover is on the receptacle overlaps the top of the receptacle and extends down to a point below said lugs, a plurality of inwardly projecting circumferentially spaced cover lugs on the inside of said depending side wall of a circumferential length less than the spaces between the receptacle lugs whereby they may be passed down between the receptacle lugs when the cover is positioned on the receptacle and brought to positions under said receptacle lugs by turning the cover on the receptacle, the receptacle lugs and the cover lugs being so spaced with respect to the rim of the receptacle and the bottom edge of said cover side wall respectively that when the cover lugs are under the receptacle lugs they are spaced vertically with respect thereto to permit limited upward movement of said cover relative to said receptacle in response to build-up of pressure in said receptacle, a pair of cooperating receptacle and cover lugs being provided one with a projecting pin and the other with a socket for receiving said pin when the cover moves up under pressure in the receptacle thereby to lock the cover against rotative movement on the receptacle, and stop means on the receptacle and cover which engage to effect the positioning of said pin with respect to the socket.

ALFRED G. SWENSON.

REFERENCES CITED

The following references are of record in the file of this patent:

UNITED STATES PATENTS

| Number | Name | Date |
| --- | --- | --- |
| 1,834,837 | Hashimoto | Dec. 1, 1931 |
| 2,022,868 | Nelson | Dec. 3, 1935 |
| 2,218,188 | Wittenberg | Oct. 15, 1940 |
| 2,549,387 | Richeson | Apr. 17, 1951 |

FOREIGN PATENTS

| Number | Country | Date |
| --- | --- | --- |
| 485,051 | Great Britain | May 13, 1938 |